Patented Aug. 26, 1952

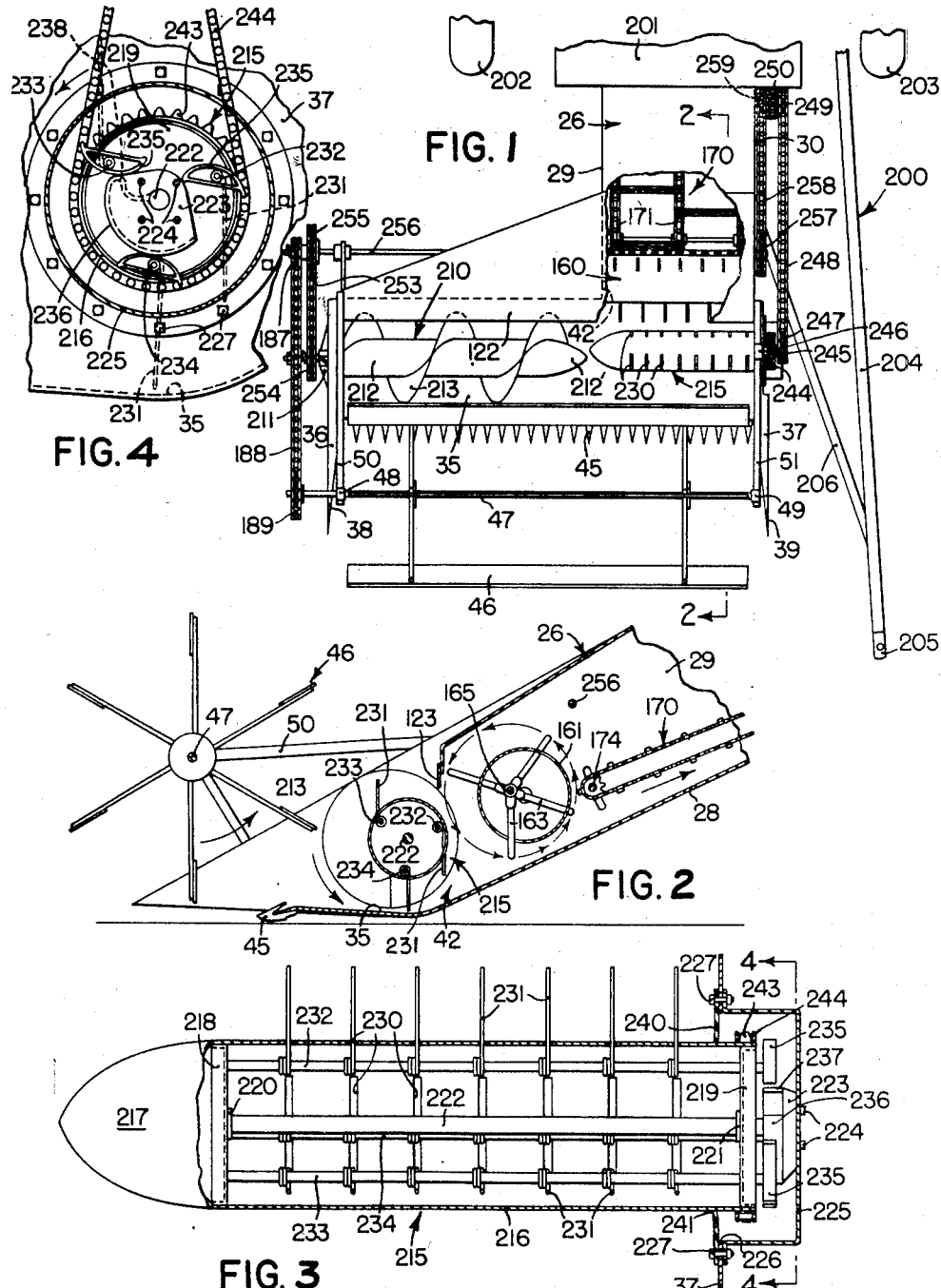

2,608,283

UNITED STATES PATENT OFFICE 2,608,283

MATERIAL-HANDLING MEANS

Alvin W. Oehler, Moline, Ill., assignor to Deere & Company, Moline, Ill., a corporation of Illinois Original application August 2, 1946, Serial No. 687,875. Divided and this application November 3, 1950, Serial No. 193,987

10 Claims. (Cl. 198—9)

This application is a division of a co-pending application Serial No. 687,875 filed August 2, 1946 and now Patent No. 2,529,180 granted November 7, 1950 and the invention herein relates generally to harvesters and more particularly to harvesters of the type comprising a comparatively narrow longitudinally extending body or housing and a harvester platform which extends laterally from the forward end of the housing, and has for its principal object the provision of novel and improved conveying and feeding mechanism for moving the harvested crops along the platform and feeding them rearwardly into the housing, where they are threshed or otherwise treated, and collected. Heretofore, comparatively few difficulties have been encountered with harvesting mechanism which feeds the harvested crops laterally through an opening in one side wall of the longitudinally extending thresher body, where the cutter bar is offset laterally outwardly from the feeder opening. Likewise, most of the problems have been solved pertaining to feeding harvested crops directly rearwardly through an opening in the front end of a harvester body or housing from a cutter bar which is disposed directly ahead of the housing. Many attempts have been made, however, to provide efficient conveying and feeding mechanism for that class of harvester in which the cutter bar extends across the front of the housing and also continues across the front of a laterally extending platform. With this type of harvester, a portion of the harvested crop must be fed directly rearwardly from that part of the cutter bar directly in front of the housing, while another part of the harvested crop must be fed laterally inwardly along the platform and then turned rearwardly into the housing, requiring a merging of the two streams of crops. It is with this third type of harvester feeder mechanism that results have not been uniformly satisfactory under varying crop conditions, for it was found that any feeding device provided in the front opening in the housing, which was effective to convey one of the streams of crops into the housing, would tend to interfere with the flow of the crop stream coming in at right angles thereto.

It is, therefore, one of the principal objects of the present invention to provide conveying and feeding mechanism which is effective to feed crops directly rearwardly from the cutter bar into the harvester body and also to convey crops laterally from the laterally extending harvester platform and feed the same rearwardly into the body together with the first mentioned crop stream.

Heretofore, the auger-type conveyor has operated satisfactorily under many varying crop conditions, where the conveyor extends into the side of the harvester body, for the auger blade itself can be continued into the housing in such a manner as to urge the crop material rearwardly into the body, such as, for example, by making the auger blade straight, within the body, and parallel to the axis of the auger. However, when this type of auger is used in connection with a harvester body having an entrance opening in the front end thereof, with the cutter bar extending across in front of the opening, the crops which are severed by this portion of the cutter bar tend to pile up in front of the auger or to wind around the latter under some crop conditions. If the auger blades are omitted from the portion of the auger shaft in front of the body opening, the shaft has a blocking effect on the crops, but if the shaft be omitted from the portion of the platform in front of the body opening, the auger can be rotatably supported from the end wall of the platform by a long overhanging bearing. The other end of the auger can be made to terminate at the edge of the feed opening and a feeder, separate from and substantially coaxial with the auger, can be provided to extend across the feed opening.

According to the principles of the present invention, the feeder is of elongated tubular construction, and of comparatively large diameter, and is perforated to receive a plurality of crop-engageable teeth that are adapted to be projected through the perforations into engagement with the crops for the purpose of sweeping the crops rearwardly, the fingers being retractable through the perforations to disengage from the crops behind the feeder. The mechanism for retracting and projecting the fingers is contained within the feeder and is protected so that it does not interfere with the flow of crops. This feeding mechanism takes care of the crops that are severed directly in front of the body opening, for feeding the severed crops rearwardly directly into the opening. The crops that are severed and deposited on the laterally extending platform are conveyed laterally inwardly by the helical auger blade, in cooperation with a stripper plate of conventional construction, behind the auger, and are discharged at the end of and behind the auger in front of the body opening. A second feeder device is provided within the body opening, in the form of a rotatable drum, which also has perforations and retractable teeth, the teeth being adapted to project forwardly into proximity with the ends of the retracted teeth within the first feeder, thereby stripping the crops from the first feeder and also engaging the crops which are discharged laterally from the platform, sweeping them under the second feeder drum, into the body housing, after which the fingers are retracted into the rear of the rotating drum to disengage them from the crops. A third crop-propelling device behind the drums then conveys the material to the threshing cylinder or other mechanism. It has been found that these two sets of retractable fingers cooperate to merge the two streams of crops and move them without interference into the body housing.

These and other objects and advantages of the present invention will be apparent to those skilled in the art after a consideration of the following description, in which reference is had to the drawings appended hereto, in which Figure 1 is a top plan view of the forward portion of a combine illustrating one preferred form of my invention, a portion of the housing being broken away to expose the crop-propelling mechanism;

Figure 2 is a sectional elevational view taken along the line 2—2 in Figure 1 and drawn to an enlarged scale;

Figure 3 is a sectional plan view of the crop-propelling device; and

Figure 4 is a sectional elevational view taken along the line 4—4 in Figure 3.

A combine 200 of the tractor-drawn type comprising a longitudinally extending thresher body 201 carried on a pair of laterally spaced wheels 202, 203 has a forwardly and laterally inclined draft tongue 204 which is secured at its rear end to the thresher body and is provided with a suitable hitch device 205 at its forward end for connection with the drawbar of a tractor. A brace 206 is attached at its forward end to the draft member 204 and extends laterally and rearwardly beneath a feeder house 26 of the harvesting mechanism. The rear end of the brace 206 is connected to the framework of the body 201. A platform or trough 35 extends laterally from one side of the feeder house 26. A stubbleward end wall 37 of the platform lies substantially in a common fore and aft extending vertical plane with a stubbleward side wall 30 of the feeder house.

A platform auger conveyor 210 is supported entirely at its outer end in a bearing 211 mounted on a grainward wall 36 of the platform. The auger conveyor comprises a shaft 212 which extends inwardly from its supporting bearing 211 and has a conical inner end 212' terminating substantially in register with a grainward side wall 29 of the feeder house. A helical vane 213 is wound around the shaft 212 and cooperates with a stripper plate 123 to urge the harvested crops laterally inwardly along the grain pan 35, discharging the same in front of an opening 42 at the forward end of the feeder house.

A crop-propelling device 215 is mounted in front of the front opening 42 in the feeder house for the purpose of receiving crops from a cutter bar 45 ahead of the opening 42 and propelling the severed crops rearwardly into the opening 42. The crop-propelling device 215 is supported entirely from the stubbleward end wall 37 of the platform and extends over the trough or grain pan 35 in front of the crop-receiving opening 42. The device 215 comprises a sheet metal drum 216 having a generally cylindrical form but the grainward end of which is tapered, as indicated at 217. The drum 216 is supported on a pair of laterally spaced spiders 218, 219, which are rigidly fixed within the drum 216 and which have hubs 220, 221, which are journaled on a central shaft 222. The shaft 222 is rigidly fixed on a supporting block 223 which in turn is rigidly mounted by means of four bolts 224 on the inner side of a cover or shield 225 which fits over an opening 226 in the end wall 37 and is secured to the latter by bolts 227. Thus, the crop-propelling device 215 is unsupported at its grainward end, which terminates near the stubbleward end 212' of the auger 210.

The tube or drum 216 is provided with series of circumferentially extending slots or perforations 230, through which are projected a plurality of crop-engageable fingers 231 arranged in three rows, each row being mounted on a rockable shaft 232, 233, 234. The shafts 232, 233, 234 are journaled at opposite ends, respectively, in the two spiders 218, 219 and are spaced radially outwardly from the axis of the shaft 222. Each rockable shaft is provided with a cam follower shoe 235 mounted on the stubbleward end thereof within the cover 225. The shoes 235 are adapted to bear upon a camming surface 236 formed on the periphery of the supporting block 223. The camming surface 236 is substantially cylindrical throughout the lower forward quadrant of the supporting block 223 and is adapted to engage the camming shoes 235 on the finger control shafts 232, 233, 234 to swing the crop-engageable fingers 231 into a generally radially extending position as the fingers approach the forward side of the drum 216, holding the fingers in a radial crop-engaging position as they swing downwardly and under the drum, thereby propelling the severed crops rearwardly beneath the drum from the cutter bar 45 ahead of the crop-propelling device 215. As the fingers 231 begin to swing upwardly behind the drum 216, the shoes 235 pass over the rear terminal edge 237 of the camming surface 236, thereby freeing the shafts at this point to permit the fingers 231 to swing downwardly and thus to be withdrawn longitudinally out of the severed crops behind the drum, thereby preventing any of the crops from being carried over the top of the drum. The fingers 231 lie generally tangentially of the drum as they pass over the top of the latter, until the shoes 235 again engage the upper end 238 of the camming surface 236, best shown in Figure 4.

As indicated in Figure 3, the stubbleward end of the drum 216 extends through the opening 226 in the side wall 37 into the hollow cover shield 225. A sealing sheet 240 is supported on the bolts 227 and covers the opening 226 between the end wall 37 and the drum 216. Preferably, the sheet 240 is flexible and has an inner edge 241 which slides upon the surface of the drum 216 to prevent dust and crops from entering the shield 225. Thus, the shield 225 and sealing sheet 240 constitute a closed housing for the camming shoes 235 and block 223. In this housing is also disposed the mechanism for driving the drum 216, and includes a sprocket 243 having teeth encircling the end of the drum 216 and secured thereto. The sprocket 243 is disposed in a plane spaced in a stubbleward direction from the plane of the end wall 37 and a drive chain 244 is trained around the sprocket 243 and extends upwardly through suitable openings in the cover shield 225 and is trained around a sprocket 245, which is mounted on an idler shaft 246 carried on the end wall 37. A second sprocket 247 is mounted on the idler shaft 246 and rigidly secured to the sprocket 245, and is driven by a chain 248 which extends rearwardly to a drive sprocket 249 mounted on the drive shaft 31 which also drives the conveyor 170. The shaft 31 is driven by a power-transmitting chain trained over a drive sprocket 250 on the shaft 31.

The auger 210 is driven by means of a power-transmitting chain 253 trained over a sprocket 254 on the drive shaft of the auger and over a drive sprocket 255 mounted on a power shaft 256 extending transversely behind the platform and through the upper portion of the feeder house 26. A sprocket 257 is fixed to the shaft 256 on the stubbleward side of the feeder house 26 and is driven by a chain 258 which is trained over a third sprocket 259 mounted on the shaft 31.

It will be noted that the crop-propelling device 215 and the auger 210 are entirely separate, which provides several advantages. One of the advantages is that the speed of rotation of the auger can be made greater than the speed of the crop-propelling device 215. It has been found somewhat desirable to drive the crop-propelling device 215 at a somewhat slower speed in order to prevent the crop from being propelled rearwardly into the opening 42 at an excessive rate of speed. The auger 210, however, must be rotated at a fairly high speed in order to clear the crops away from the platform as fast as they are delivered thereto by the cutter bar 45. With this construction, another advantage is that the crop-propelling device 215 need not be disposed coaxially with the auger 210, and therefore permits greater freedom in designing the two crop-propelling devices 160, 215, and the auger 210, as to diameter of drum, length of fingers, and height above the platform 35 and bottom floor 28 of the feeder house.

I claim:

1. In a harvester including a longitudinally extending body housing having a crop-receiving opening at its forward end and a harvesting platform extending laterally from said housing, the improvement comprising: a tubular member rotatably supported above said platform and terminating at one side of the crop-receiving opening, a helical auger blade fixed to said member and extending to the terminal end thereof; a second tubular member separate from the first tubular member and extending across the front of the crop-receiving opening and rotatable on an axis closely offset fore and aft relative to and paralleling the axis of the first tubular member, said second member having perforations, a plurality of crop-engageable fingers extending outwardly of said second tubular member through said perforations, means responsive to rotation of said second member for projecting said fingers into engagement with crops to sweep the crops rearwardly in said housing and for retracting said fingers inwardly of said perforations to disengage said fingers from the crops behind said tubular member, and a rotary crop-moving device disposed within said housing behind and paralleling the second member, said device comprising a perforated drum having crop-engageable fingers therewithin and control means in said drum responsive to rotation thereof for projecting said fingers through said perforations into proximity with the retracted ends of the fingers in the rear side of said tubular conveyor member, said drum fingers being adapted to swing rearwardly in projected relation to said drum and to be retracted at the rear of said drum to disengage the crops.

2. In a harvester including a longitudinally extending body housing having a crop-receiving feed opening in its forward end and a harvesting platform having a front crop-receiving edge extending across the forward end of said housing in front of said opening and also extending laterally from said housing, the improvement comprising: an auger rotatably supported above the platform and terminating at one side of the feed opening; a feeder member in the form of a tube extending from the terminal end of the auger across the feed opening, said tube being separate from the auger and rotatable above that portion of the platform ahead of the feed opening on an axis parallel to and offset fore and aft as respects the auger axis, said tube having perforations therein, a plurality of crop-engageable fingers in said tube projectable and retractable out of and into the latter through said perforations, means responsive to rotation of said tube for projecting said fingers forwardly and downwardly into engagement with crops in front of said tube to sweep the crops rearwardly into said opening and for retracting said fingers inwardly of said perforations to disengage said fingers from the crops behind said tube, and a rotary crop-moving device disposed within said housing behind and parallel to said tube, said device comprising a perforated drum having crop-engageable fingers therewithin and control means in said drum responsive to rotation thereof for projecting said fingers through said perforations into proximity with the retracted ends of the fingers in the rear side of said tubular conveyor member, said drum fingers being adapted to swing rearwardly in projected relation to said drum and to be retracted at the rear of said drum to disengage the crops.

3. In a harvester having a fore and aft extending body provided with a forwardly directed feed opening ahead of which is a transversely elongated platform structure including a part in front of the feed opening and a transversely elongated part adjoining and projecting laterally as an extension of the part in front of the feed opening, the improvements comprising: a first, elongated, generally cylindrical crop-moving conveyor portion extending lengthwise over the extension part of the platform, terminating at the junction of said extension part with said first part and having means for the mounting thereof on the platform structure for rotation about its principal axis, and including a helical vane thereon about said axis for moving crops laterally toward the feed opening; and a second rotatable crop-moving conveyor portion of hollow cylindrical construction separate from the first conveyor portion and disposed ahead of the feed opening over the proximate platform part for rotation about an axis parallel to and offset fore and aft as respects the axis of the first conveyor portion, crop-engaging fingers carried by said second conveyor portion for rotation therewith and mounted for extension and retraction outwardly and inwardly relative to the outer cylindrical surface of said second conveyor portion, and means for effecting extension and retraction of said fingers as said second conveyor portion rotates.

4. In a harvester having a longitudinal body provided with a forward feed opening and a transverse, horizontal elongated platform structure including a first platform part across and in front of the feed opening and an extension platform part projecting to one side of the feed opening as a continuation of the first part so that the platform structure is effective to receive crops rearwardly over its entire length, said first part having an end wall projecting forwardly at the side of the feed opening opposite to that from which the extension part projects, and said extension part having an end wall projecting forwardly at its end remote from the feed opening, an auger conveyor extending lengthwise over only the extension part and having one end proximate to the extension-part end wall and its opposite, discharge end proximate to the near side of the feed opening, means supporting and journaling the auger at its wall-proximate end on said wall, a feeder device of elongated, hollow cylindrical construction separate from the auger and extending horizontally across and ahead of the feed opening from the end wall of the first platform part to but just short of the discharge end of the auger, means supporting and journaling the feeder device at its wall-proximate end to said wall, said device having its peripheral wall provided with perforations, a plurality of crop-engaging fingers carried within the device and extending outwardly through said perforations, and means operative in response to rotation of the device for successively extending and retracting said fingers.

5. In a harvester having a longitudinal body provided with a forward feed opening and a transverse, horizontal elongated platform structure including a first platform part across and in front of the feed opening and an extension platform part projecting to one side of the feed opening as a continuation of the first part so that the platform structure is effective to receive crops rearwardly over its entire length, said first part having an end wall projecting forwardly at the side of the feed opening opposite to that from which the extension part projects, and said extension part having an end wall projecting forwardly at its end remote from the feed opening, an elongated conveyor extending and running lengthwise over only the extension platform part and having one end proximate to the extension-part end wall and its opposite end proximate to the near side of the feed opening; means supporting the conveyor in cantilever fashion from the extension-part end wall; a feeder device of elongated hollow construction separate from the conveyor and extending horizontally across and ahead of the feed opening from the end wall of the first platform part to but just short of the discharge end of the conveyor, means supporting the feeder device in cantilever fashion from the first-part end wall, said means including a bearing journaling the device for rotation on its principal axis, said device having its peripheral wall provided with perforations, a plurality of crop-engaging fingers carried within the device and extending outwardly through said perforations, and means operative in response to rotation of the device for successively extending and retracting said fingers.

6. In a harvester having a longitudinal body provided with a forward feed opening and a transverse, horizontal elongated platform structure including a first platform part across and in front of the feed opening and an extension platform part projecting to one side of the feed opening as a continuation of the first part so that the platform structure is effective to receive crops rearwardly over its entire length, said first part having an end wall projecting forwardly at the side of the feed opening opposite to that from which the extension part projects, and said extension part having an end wall projecting forwardly at its end remote from the feed opening; an elongated conveyor extending and running lengthwise over only the extension platform part and having one end proximate to the extension-part end wall and its opposite end proximate to the near side of the feed opening; an elongated feeder device positioned lengthwise across and horizontally over the first platform part ahead of the feed opening and extending from an end portion proximate to but spaced lengthwise from the discharge end of the conveyor to an end proximate to the first-part end wall, a plurality of extensible and retractable crop-engaging elements carried by the feeder device, means journaling the feeder device on the first-part end wall for rotation about its horizontal axis, and means controlling the crop-engaging elements and operative in response to rotation of the device for successively extending and retracting said elements.

7. The invention defined in claim 6, in which: the means journaling the feeder device includes a single support carrying the device at its wall-proximate end in cantilever fashion to leave the opposite end of said device free to receive crop material from the discharge end of the conveyor, and said opposite end of the device has an end cap of generally conical shape pointed toward said discharge end of the conveyor.

8. The invention defined in claim 7, in which: the conveyor comprises an auger rotatable on an axis parallel to and offset in a fore and aft direction as respects the axis of the device, the discharge end of the auger has an end cap of generally conical shape pointing toward the end cap of the device, and the points of said caps overlap.

9. In a harvester having a fore and aft extending body provided with a forwardly directed feed opening ahead of which is a transversely elongated platform structure including a part in front of the feed opening and a transversely elongated part adjoining and projecting laterally as an extension of the part in front of the feed opening, the improvement comprising: a first, elongated crop-moving means extending lengthwise over the extension part of the platform and having means for the mounting thereof on the platform structure for movement relative to the platform structure to move crops in a transverse path toward the feed opening; and a second crop-moving means structurally separate from the first crop-receiving means and disposed ahead of the feed opening over the proximate platform part and alined lengthwise with the first conveyor portion so that the first conveyor portion feeds crops directly and lengthwise thereof into said second portion and said second portion having a pair of relatively movable crop-engaging elements, each arranged to move in a closed orbital path transverse to the feeding path of the first conveyor portion to move crops rearwardly to the feed opening, and said elements being so constructed, timed and arranged that the areas of the paths through which said elements travel overlap but are offset from front to rear so that one element tends to strip crops from the other.

10. In a harvester having a longitudinal body provided at its forward end with a crop-receiving opening having opposite sides and a bottom, the improvement comprising: means providing a transverse elongated auger trough including a bottom wall element having a first portion extending across the crop-receiving opening generally at the level of the bottom of said opening and a continuing second portion projecting horizontally laterally outwardly beyond one side of said opening, and a generally upright rear wall element joined to and substantially coextensive with said second portion of the bottom wall element and having an inner terminal end adjacent said one side of said opening; an elongated auger means rotatably carried above said second portion of the bottom wall element and spaced closely ahead of and substantially coextensive with the rear wall element to have an inner terminal end adjacent said one side of the crop-receiving opening, said auger being rotatable to move crops downwardly against the bottom wall element and rearwardly against the rear wall element and simultaneously laterally inwardly toward the first portion of the bottom element; and feeder means disposed above said first portion of the bottom element and ahead of the crop-receiving opening, adjoining but structurally separate from the auger means at said terminal end of the upright rear wall and rotatable about an axis parallel to but offset in a fore and aft direction from the axis of the auger means, said feeder means including crop-engaging elements movable in a closed path in an orbit having said offset axis as a center to travel rearwardly closely over said first portion of the bottom wall element and then upwardly ahead of a transverse upright plane including said rear wall element, the dimensions of said auger means and said feeder means and the aforesaid offset of said auger and feeder axes being such that the rear portion of the surface generated by the moving crop-engaging elements is ahead of the rear portion of the surface generated by the auger means to provide an unobstructed area at the junction of the auger and feeder means and proximate to the crop-receiving opening so that crops moved along the rear and bottom wall of the trough may pass directly below and behind the feeder means.

ALVIN W. OEHLER.

REFERENCES CITED

The following references are of record in the file of this patent:

UNITED STATES PATENTS

| Number | Name | Date |
| --- | --- | --- |
| 2,455,905 | Ronning | Dec. 7, 1948 |